J. Q. PRIMM.
AUTOMOBILE TRUCK.
APPLICATION FILED SEPT. 28, 1911.
1,037,312.
Patented Sept. 3, 1912.
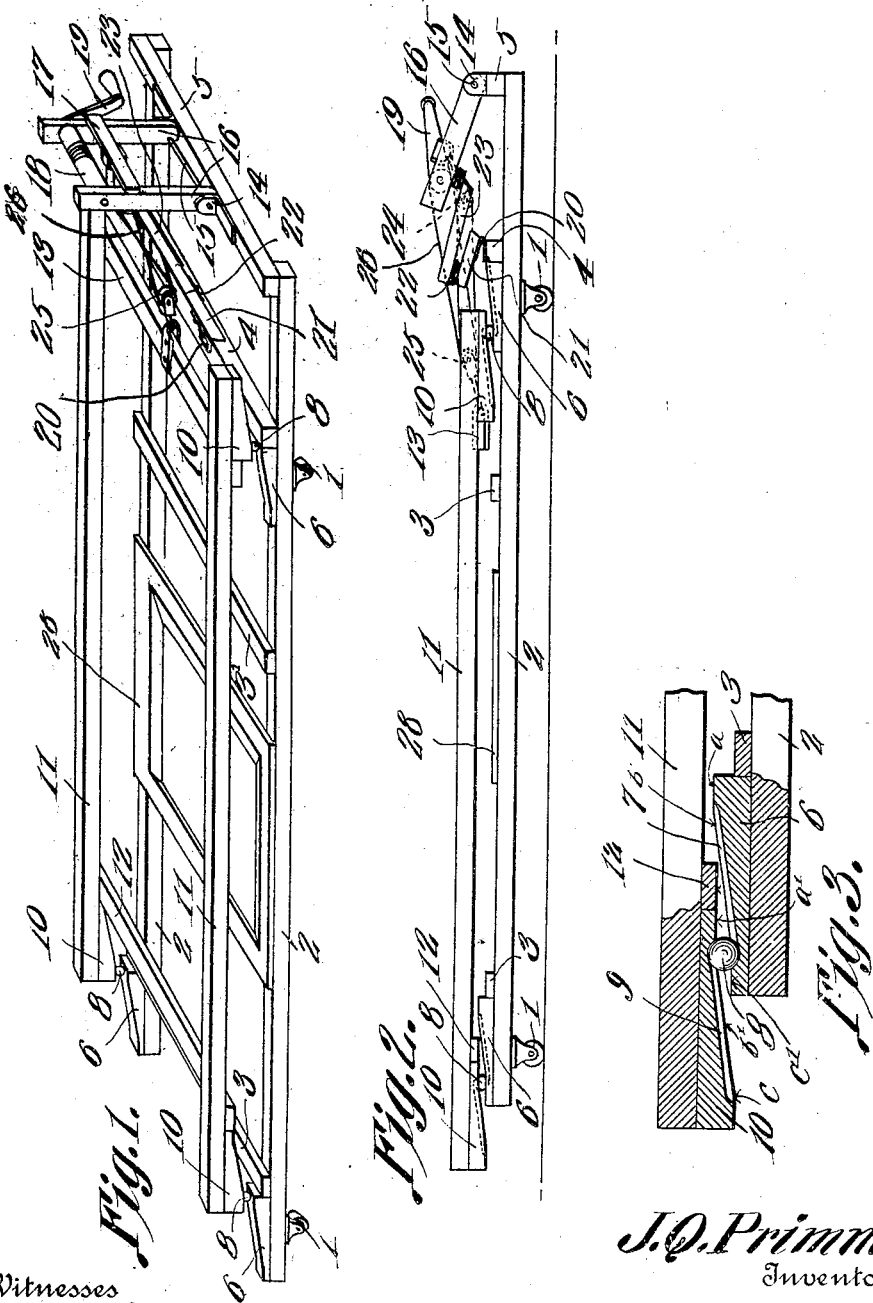
J. Q. Primm,
Inventor
Witnesses

UNITED STATES PATENT OFFICE.

JOHN Q. PRIMM, OF LINCOLN, ILLINOIS.

AUTOMOBILE-TRUCK.

1,037,312.  Specification of Letters Patent.  Patented Sept. 3, 1912.

Application filed September 28, 1911. Serial No. 651,880.

*To all whom it may concern:*

Be it known that I, JOHN Q. PRIMM, a citizen of the United States, residing at Lincoln, in the county of Logan and State of Illinois, have invented a new and useful Automobile-Truck, of which the following is a specification.

The present invention relates to improvements in automobile trucks, the primary object of the invention being the provision of a simple and durable portable form of truck, the same comprising a portable lower frame and an anti-frictionally mounted movable upper frame disposed thereupon and provided with novel means for moving the same relatively to the lower frame, the anti-frictional means between the respective frames being so disposed as to cause the upper frame to move upwardly in parallel position during its movement toward and from the windlass mounted upon the main frame.

A further object of the present invention is the provision of an automobile truck comprising two frames the lower frame of which is a rigid frame mounted upon casters while the upper frame thereof is mounted so as to have imparted thereto longitudinal and upward movement when moved with relation to the main frame, the said upward movement having a tendency to act as a jack to lift the automobile relatively to the main frame or permit the depositing of the same upon the ground when desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a perspective view of the complete truck. Fig. 2 is a side elevation thereof with the windlass shown in collapsed position. Fig. 3 is an enlarged detail sectional view of one of the anti-frictionally disposed bearings between stationary and movable frames employing a ball.

Referring to the drawings, the numeral 1 designates the casters which support the two longitudinal strips 2 of the lower main frame, the said strips being connected together and held in rigid parallelism by means of the bars 3, 3', 4 and 5.

Disposed upon the respective bars or side strips 2 of the main frame at one end thereof and near the other end thereof are the two blocks 6, which as shown in detail in Fig. 3 of the drawings, are each provided with the upper face $a$ which is parallel to the upper face of the strip 2, the intermediate inclined face $b$, and the lower flat face or plane $c$ which is parallel to the upper face of the strip 2 and the face $a$ but at a lower plane. Each one of these blocks 6 is provided with the groove 7, in which is adapted to be mounted for anti-frictional movement the ball bearing 8, which fits within the groove 9 of a similarly shaped block 10 carried upon the under side of the longitudinal strips 11 of the upper or movable frame of the truck. These grooves 7 are provided with the upper planes $a'$, the inclined face $b'$ and the parallel face $c'$, these respective faces being in alinement or in parallel with the respective faces $a$, $b$ and $c$ of the blocks 6.

The longitudinal strips 11 of the movable frame are held relatively together and in parallel by means of the transverse bars 12 and 13 and by reason of the fact that there are four pairs of the blocks 6 and 10, which support the movable frame at four points upon the main or lower frame, through the medium of the balls 8, it is evident that an anti-frictional bearing is formed between these blocks. By this arrangement, any longitudinal movement of the upper frame upon and relative to the lower frame, due to the blocks 6 and 10 and the balls 8, will elevate or lower the upper movable frame. By means of the grooves and the balls 8, it is evident that the movable frame is prevented any sidewise movement, the balls within the grooves holding the frames relatively to each other so that any movement imparted to the upper frame lifts or lowers the upper movable frame in parallel from and toward the lower stationary frame.

Carried by the cross bar 5 of the stationary or main frame, are two eyed lugs or brackets 14, which by means of the rod 15 form a hinge connection for the uprights 16 which are held relative to each other by means of the cross piece 17, the windlass 18 with its crank 19 being journaled in the upper end of said standards and being permitted a swinging movement to or from full lines in Fig. 2 to full lines in Fig. 1. In order to do this and permit the windlass frame to assume the positions as shown, a sectional or hinged brace is employed, the same having its lower end connected by hinge 20 to the transverse bar 4 of the lower frame and having its lower section 21 hingedly connected by a hinge 22 to the upper section 23, which is hinged to the windlass frame to permit the same to assume a desired position.

Connected to the cross piece 17 at the upper end of the posts 16 is a pulley and sheave 24, while connected to the transverse strip 13 of the movable frame is a block and tackle 25, to which is connected the cable 26 which is threaded through the respective pulleys and is connected rigidly at one end to the cross piece 17 while its other end is wound upon the drum 18.

When the device is in use the parts assume the position as shown in Fig. 1, and when not in use they assume the position as shown in full lines in Fig. 2.

A drip pan 28 is mounted transversely of the lower frame to catch the dripping oils and may be moved at pleasure.

From the foregoing description taken in connection with the drawings, it will be seen that by providing the inclined anti-frictional supports between the stationary and movable frames, any movement of the movable frame toward the windlass, due to the blocks 6 and 10 and the balls 8, will impart to the movable frame an upward and parallel movement with relation to the lower frame, and that any movement in the opposite direction which will be caused by the gravity of the upper frame with the weight thereupon, will cause the movable frame to move away from the windlass and to a lower level thus providing an entirely efficient automobile truck or automobile jack, which will permit the proper elevating or lifting of an entire machine in a level position.

By reason of the fact that the device is made up of the two frames and provided with a folding windlass, which when not in use occupies a very small amount of space, and can be quickly placed into operable position for use, only a small space for storage is needed and a body of an automobile may pass thereover.

It is also evident that any form of movable frame may be employed and provided with proper guiding and holding means for retaining an automobile thereupon, in the present instance, there simply being shown an open frame whereby the various details are more clearly shown.

What is claimed is:—

1. A truck of the character described having a lower portable frame, another frame disposed thereabove and movable longitudinally of the lower frame, a plurality of pairs of blocks disposed in co-active relation between the respective frames, the opposed faces of said blocks being so constructed as to cause the movable frame to be moved to and from the lower frame during the longitudinal movement of the upper frame, the opposed faces of each pair of said blocks being provided with alining grooves and a ball disposed in the respective grooves in each pair of blocks for forming an antifrictional bearing therebetween.

2. A truck of the character described having a lower portable frame, another frame disposed thereabove and movable longitudinally of the lower frame, a plurality of pairs of blocks disposed in co-active relation between the respective frames, the opposed faces of said blocks being so constructed as to cause the movable frame to be moved to and from the lower frame during the longitudinal movement of the upper frame, the opposed faces of each pair of said blocks being provided with alining grooves and a ball disposed in the respective grooves in each pair of blocks for forming an antifrictional bearing therebetween, said balls and grooves co-acting to prevent transverse movement of the movable frame with relation to the lower frame.

3. A truck of the character described having a lower portable frame, another frame disposed thereabove and movable longitudinally of the lower frame, a plurality of pairs of blocks disposed in co-active relation between the respective frames, the opposed faces of said blocks being so constructed as to cause the movable frame to be moved to and from the lower frame during the longitudinal movement of the upper frame, the opposed faces of each pair of said blocks being provided with alining grooves and a ball disposed in the respective grooves in each pair of blocks for forming an antifrictional bearing therebetween, and a windlass disposed at one end of the lower frame and operably connected to the movable frame for imparting the longitudinal movement to the movable frame.

4. A truck of the character described having a lower portable frame, another frame disposed thereabove and movable longitudinally of the lower frame, a plurality of pairs of blocks disposed in co-active relation between the respective frames, the opposed faces of said blocks being so constructed as to cause the movable frame to be moved to and from the lower frame during the longitudinal movement of the upper frame, the opposed faces of each pair of said blocks being provided with alining grooves and a ball disposed in the respective grooves in each pair of blocks for forming an antifrictional bearing therebetween, said balls and grooves co-acting to prevent transverse movement of the movable frame with relation to the lower frame, and a windlass disposed at one end of the lower frame and operably connected to the movable frame for imparting the longitudinal movement to the movable frame.

In testimony that I claim the foregoing as my own, I have hereto affixed my signature in the presence of two witnesses.

JOHN Q. PRIMM.

Witnesses:
 A. C. BRAUCHER,
 I. B. PETITT.